(12) United States Patent
Huang et al.

(10) Patent No.: US 8,696,183 B2
(45) Date of Patent: Apr. 15, 2014

(54) BACKLIGHT MODULE

(75) Inventors: Yi-Pai Huang, Hsinchu (TW); Ching-Yi Hsu, Hsinchu (TW); Chih-Hung Ting, Hsinchu (TW); Che-Hsuan Yang, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 134 days.

(21) Appl. No.: 13/523,636

(22) Filed: Jun. 14, 2012

(65) Prior Publication Data
US 2013/0336002 A1 Dec. 19, 2013

(30) Foreign Application Priority Data
Jun. 29, 2011 (TW) .............................. 100211831 U

(51) Int. Cl.
*F21V 7/22* (2006.01)
*G02B 6/42* (2006.01)

(52) U.S. Cl.
USPC ........... 362/608; 362/618; 362/621; 362/624; 362/627

(58) Field of Classification Search
USPC ......... 362/606, 608, 609, 618, 621, 622, 624, 362/627
See application file for complete search history.

(56) References Cited

U.S. PATENT DOCUMENTS

| | | | | |
|---|---|---|---|---|
| 3,752,974 A | * | 8/1973 | Baker et al. | 362/627 |
| 5,788,356 A | * | 8/1998 | Watai et al. | 362/621 |
| 6,123,430 A | * | 9/2000 | Ono et al. | 362/608 |
| 6,313,891 B1 | * | 11/2001 | Nagakubo et al. | 349/65 |
| 6,435,685 B2 | * | 8/2002 | Matsushita | 362/608 |
| 7,163,331 B2 | * | 1/2007 | Suzuki et al. | 362/610 |
| 7,520,652 B2 | * | 4/2009 | Yamashita et al. | 362/608 |
| 7,528,893 B2 | | 5/2009 | Schultz et al. | |
| 7,576,805 B2 | | 8/2009 | Ito et al. | |
| 7,780,330 B2 | * | 8/2010 | Aylward et al. | 362/613 |
| 8,403,548 B2 | * | 3/2013 | Kim et al. | 362/606 |
| 8,511,879 B2 | * | 8/2013 | Im | 362/609 |
| 2008/0055931 A1 | * | 3/2008 | Verstraete et al. | 362/612 |

FOREIGN PATENT DOCUMENTS

TW 200821708 A 5/2008

* cited by examiner

*Primary Examiner* — Alan Cariaso
(74) *Attorney, Agent, or Firm* — Muncy, Geissler, Olds & Lowe, P.C.

(57) ABSTRACT

A backlight module has a light guide plate, a notch structure, a light absorption layer, and at least one light source. The light guide plate has a light-emitting surface and at least one side surface forming an angle with the light-emitting surface. The notch structure is continuously formed on the side surface and concave towards the inside of the light guide plate. The light absorption layer is distributed on an area substantially overlapping the notch structure, and the light source is stored in the notch structure.

13 Claims, 5 Drawing Sheets

BACKLIGHT MODULE

BACKGROUND OF THE INVENTION a. Field of the Invention

The invention relates to a backlight module.

b. Description of the Related Art

FIG. 5 shows a schematic diagram illustrating a conventional display device having two different viewing angles. Referring to FIG. 5, a display device 100 includes a light guide plate 102, a right-side light source 104, a left-side light source 106, a parallax film 108 and a display panel 110. The right-side light source 104 and the left-side light source 106 are alternately turned on and off in succession, and the parallax film 108 deflects light beams emitted by the right-side light source 104 towards the left-hand side and light beams emitted by the left-side light source 106 towards the right-hand side, respectively. Accordingly, two eyes of a viewer receive light beams having two different light-emitting angles respectively to achieve a stereoscopic (three-dimensional) visual effect. However, for example, when the left-side light source 106 is turned on, a part of the light beams emitted by the left-side light source 106 (such as a light beam IL) is incident on a right-side surface 102a of the light guide plate 102 and reflected by the right-side surface 102a, as shown in FIG. 6. In that case, the light beam IL is guided towards an incorrect or unexpected direction. This may result in optical crosstalk and adversely affect image quality and brightness.

U.S. Pat. No. 7,528,893 discloses a backlight module for a stereoscopic display device, wherein a light guide plate of the backlight module includes a light-emitting surface, a first light incident surface, and a second light incident surface opposite the first light incident surface. A lot of anti-refection features are disposed on the first light incident surface and the second light incident surface. Each of the anti-refection features has at least two surfaces, and each of the surfaces is spread with a light absorption layer. Though this design may reduce optical crosstalk, the anti-refection features are difficult to be fabricated and need to be specifically defined an entrance to pass the light. This may result in complicated fabrication processes and considerable fabrication costs. U.S. Pat. No. 7,576,805 discloses a stereoscopic display device having a light guide plate and two light sources. A light transmission portion and an anti-reflection portion are formed on two ends of the light guide plate, and the anti-reflection portion serves the purpose of reducing optical crosstalk. However, in this design, inclined surfaces need to be formed on a specific position. Such design would result in complicated fabrication processes. Further, Taiwan patent application publication No. 200821708 discloses a backlight module having a light guide plate. The light guide plate includes a plate, at least one first notch, and at least one second notch. The first notch is formed on a side of the plate, the second notch is formed at the bottom of the first notch and the side of the plate, and the bottom of the second notch is substantially in the shape of a trapezoid.

BRIEF SUMMARY OF THE INVENTION

The invention provides a backlight module having reduced optical crosstalk in the application of stereoscopic effects and improved luminous efficiency.

Other objects and advantages of the invention may be further illustrated by the technical features broadly embodied and described as follows. In order to achieve one of or part or all of the above purposes or other purposes, one embodiment of the invention provides a backlight module having a light guide plate, a notch structure, a light absorption layer, and at least one light source. The light guide plate has a light-emitting surface and at least one side surface forming an angle with the light-emitting surface. The notch structure is continuously formed on the side surface and concave towards the inside of the light guide plate. The light absorption layer is distributed on an area substantially overlapping the notch structure, and the light source is stored in the notch structure.

In one embodiment, the notch structure has at least one inclined surface forming an angle with the light-emitting surface, the area of the light absorption layer distributed substantially overlaps a projection area of the at least one inclined surface projected on the light-emitting surface.

In one embodiment, the light guide plate further has a bottom surface opposite the light-emitting surface, the notch structure has at least one inclined surface forming an angle with the bottom surface, and the area of the light absorption layer substantially overlaps a projection area of the at least one inclined surface projected on the bottom surface.

In one embodiment, a length of the notch structure extending in a longitudinal direction is substantially equal to a length of the side surface.

In one embodiment, the notch structure has a trapezoidal shaped cross-section.

In one embodiment, the inclined surface of the notch structure forms an angle with the light-emitting surface, and the angle is larger than or equal to 30 degrees and smaller than or equal to 60 degrees.

In one embodiment, the backlight module further includes a parallax film disposed on the light-emitting surface of the light guide plate, and the parallax film has a reverse prism structure to deflect a light beam emitting from the light emitting surface.

According to another embodiment of the invention, a backlight module has a light guide plate, a first notch structure, a second notch structure, a first light absorption layer, a second light absorption layer, a first light source, and a second light source. The light guide plate has a light-emitting surface, a bottom surface opposite the light-emitting surface, a first side surface, and a second side surface opposite the first side surface. Each of the first side surface and the second side surface forms an angle with the light-emitting surface. The first notch structure is continuously formed on the first side surface and concave towards the inside of the light guide plate, and the first notch structure has at least one first inclined surface forming an angle with the light-emitting surface. A second notch structure is continuously formed on the second side surface and concave towards the inside of the light guide plate, and the second notch structure has at least one second inclined surface forming an angle with the light-emitting surface. The first light absorption layer is disposed on a part of the light-emitting surface to absorb a light beam deflected by the first inclined surface or the second inclined surface. The second light absorption layer is disposed on a part of the bottom surface to absorb a light beam deflected by the first inclined surface or the second inclined surface. The first light source is stored in the first notch structure, and the second light source is stored in the second notch structure.

In one embodiment, a distribution area of the first light absorption layer substantially overlaps a projection area of the first inclined surface and the second inclined surface projected on the light-emitting surface, and a distribution area of the second light absorption layer substantially overlaps a projection area of the first inclined surface and the second inclined surface projected on the bottom surface.

In one embodiment, a length of the first notch structure extending in a longitudinal direction is substantially equal to a length of the first side surface, and a length of the second notch structure extending in a longitudinal direction is substantially equal to a length of the second side surface.

In one embodiment, each of the first notch structure and the second notch structure has a trapezoidal-shaped cross-section.

In one embodiment, an angle formed between the first inclined surface and the light-emitting surface is larger than or equal to 30 degrees and smaller than or equal to 60 degrees, and an angle formed between the second inclined surface and the light-emitting surface is larger than or equal to 30 degrees and smaller than or equal to 60 degrees.

In conclusion, the backlight module of the embodiment or the embodiments of the invention may have at least one of the following advantages.

When a part of the light beams emitted from one end of the light guide plate is incident to an opposite end of the light guide plate, the part of the light beams is deflected by a notch structure disposed on the opposite end and absorbed by the light absorption layer. Therefore, the light beam traveling in an incorrect direction is not received by a viewer and the optical crosstalk is reduced. Further, since an inclined surface is continuously formed to achieve the effect of light deflection, specific micro structures disposed in the front of a light source may not be required and the light source need not be arranged in a specific position corresponding to the position of the specific micro structures. Therefore, the fabrication or assembly processes may be simplified and high luminous efficiency is achieved. Besides, the light absorption layer may also serve to absorb or shield stray light traveling in a light-mixing area of a light guide plate to improve image quality.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
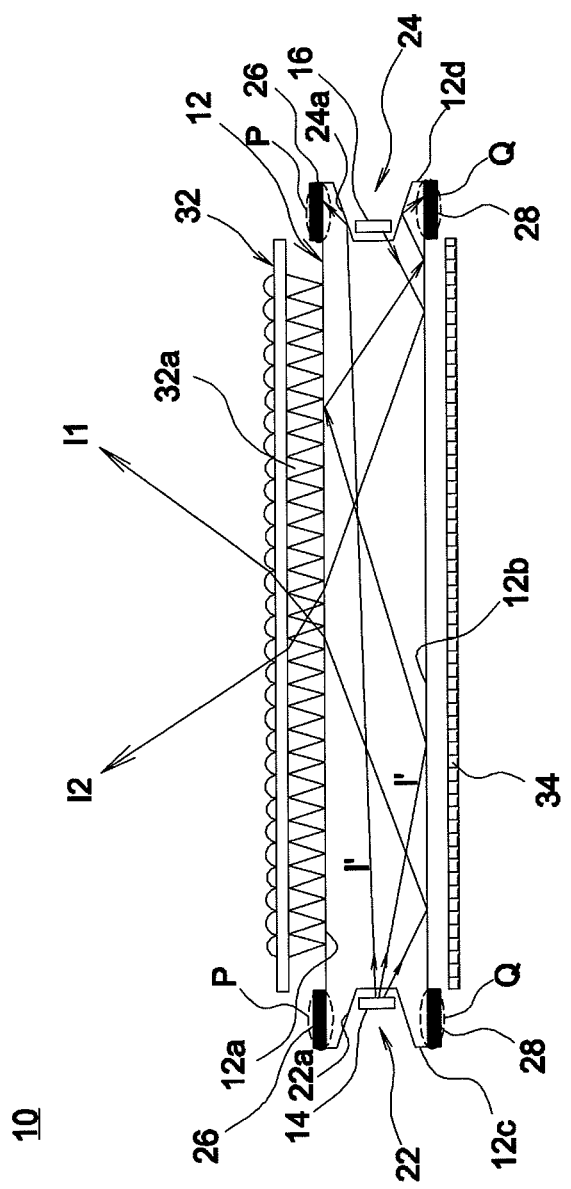
FIG. 1 shows a schematic diagram of a backlight module according to an embodiment of the invention.

FIG. 1 shows a schematic diagram of a backlight module according to an embodiment of the invention. Referring to FIG. 1, a backlight module 10 includes a light guide plate 12, a first light source 14, and a second light source 16. The light guide plate 12 has a light-emitting surface 12a, a bottom surface 12b opposite the light-emitting surface 12a, a first side surface 12c, and a second side surface 12d opposite the first side surface 12c. Each of the first side surface 12c and the second side surface 12d forms an angle with the light-emitting surface 12a. A first notch structure 22 is formed on the first side surface 12c and concave towards the inside of the light guide plate 12, and the first notch structure 22 has at least one first inclined surface 22a forming an angle with the light-emitting surface 12a. A second notch structure 24 is formed on the second side surface 12d and concave towards the inside of the light guide plate 12, and the second notch structure 24 has at least one second inclined surface 24a forming an angle with the light-emitting surface 12a. In one embodiment, each of the angle between the light-emitting surface 12a and the first inclined surface 22a and the angle between the light-emitting surface 12a and the second inclined surface 24a is larger than or equal to 30 degrees and smaller than or equal to 60 degrees. A first light absorption layer 26 is disposed on a part of the light-emitting surface 12a, and a second light absorption layer 28 is disposed on a part of the bottom surface 12b. In this embodiment, each of the first notch structure 22 and the second notch structure 24 has two inclined surfaces arranged in symmetry to form a trapezoidal-shaped cross-section, wherein one inclined surface forms an angle with the light-emitting surface 12a, and the other inclined surface forms an angle with the bottom surface 12b. A distributing area of the first light absorption layer 26 substantially overlaps or corresponds to a projection area P of the first inclined surface 22a or the second inclined surface 24a projected on the light-emitting surface 12a. A distributing area of the second light absorption layer 28 substantially overlaps or corresponds to a projection area Q of the first inclined surface 22a or the second inclined surface 24a projected on the bottom surface 12b. In other words, each of the first light absorption layer 26 and the second light absorption layer 28 distributed on an area substantially overlaps the notch structure(s). A parallax film 32 is disposed on the light-emitting surface 12a of the light guide plate 12, and a reflective sheet 34 is disposed on the bottom surface 12b of the light guide plate 12. In one embodiment, the parallax film 32 may include a reverse prism structure 32a capable of reflecting and refracting incoming light beams to achieve the effect of light deflection. When the first light source 14 is turned on, most of the light beams emitted by the first light source 14 (such as a light beam I1) is deflected by the parallax film 32 towards the right side. When the second light source 16 is turned on, most of the light beam emitted by the second light source 16 (such as a light beam I2) is deflected by the parallax film 32 towards the left side. Therefore, the first light source 14 and the second light source 16 are alternately turned on and off in succession to achieve a stereoscopic visual effect. However, when the first light source 14 is turned on, a part of the light beams emitted by the first light source 14 (such as a light beam I') is incident on the second side surface 12d of the light guide plate 12 directly or through reflection. In that case, the second side surface 12d deflects the light beam I', which was originally expected to leave the light guide plate 12 in a direction towards the right side, towards the left side to result in optical crosstalk and hence adversely affect image quality and brightness, if the design of this embodiment (which will be discussed below) is not incorporated.

According to this embodiment, taking the right side of the light guide plate 12 as an example, since the second inclined surface 24a of the second notch structure 24 forms an angle with the light-emitting surface 12a, the light beam I' emitted by the first light source 14 incident towards the second side surface 12d of light guide plate 12 is reflected by the second inclined surface 24a and absorbed by the first light absorption layer 26 on the light-emitting surface 12a or the second light absorption layer 28 on the bottom surface 12b. Similarly, the light beam (not shown) emitted by the second light source 16 towards the first side surface 12c of the light guide plate is reflected by the first inclined surface 22a and absorbed by the first light absorption layer 26 adjacent to the first side surface 12c on the light-emitting surface 12a or the second light absorption layer 28 adjacent to the first side surface 12c on the bottom surface 12b. Therefore, light beams emitted by the light sources 14 and 16 are allowed to be guided towards a correct direction to reduce optical crosstalk.

Figure 2:
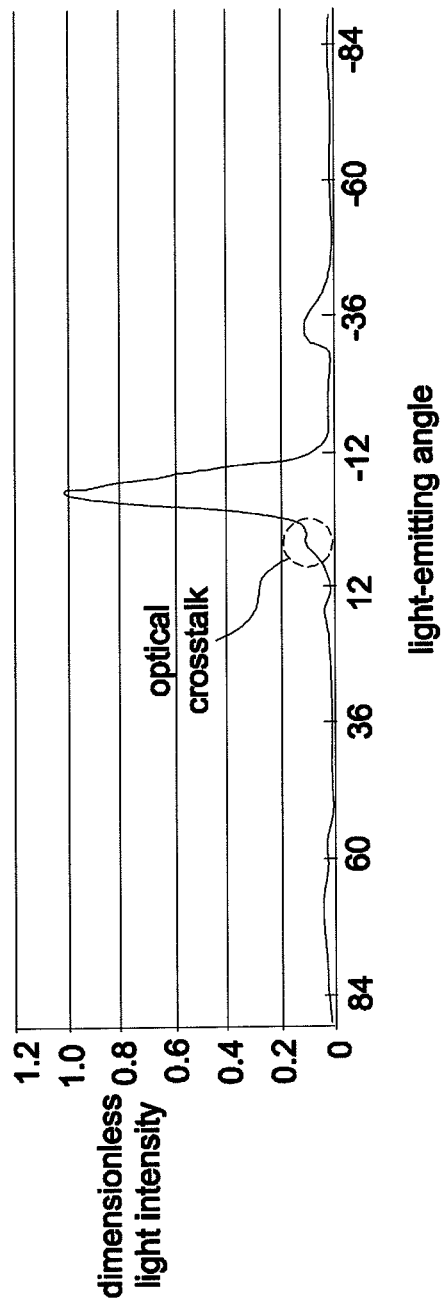
FIG. 2 shows a curve diagram illustrating the optical performance of the backlight module shown in FIG. 1.

As shown in FIG. 2, for example, according to the design of the backlight module 10 of FIG. 1, a proportion of light resulting in optical crosstalk could decrease to less than 15%.

Figure 3A:
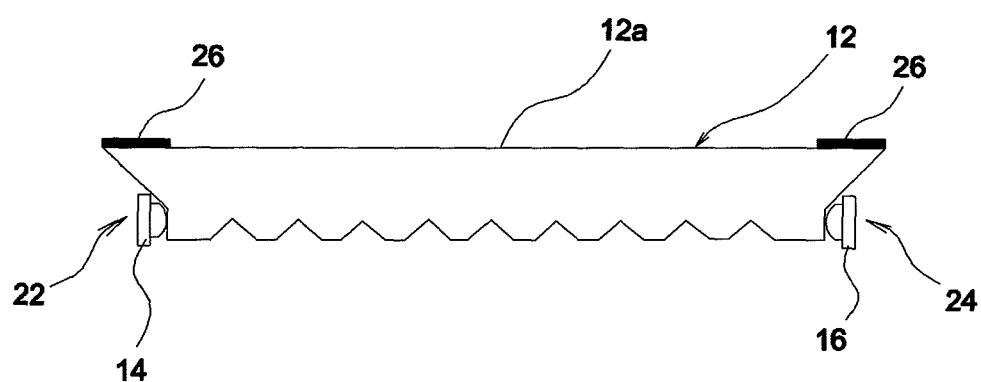
FIG. 3A and FIG. 3B shows schematic diagrams of a backlight module according to another embodiments of the invention.
Figure 3B:
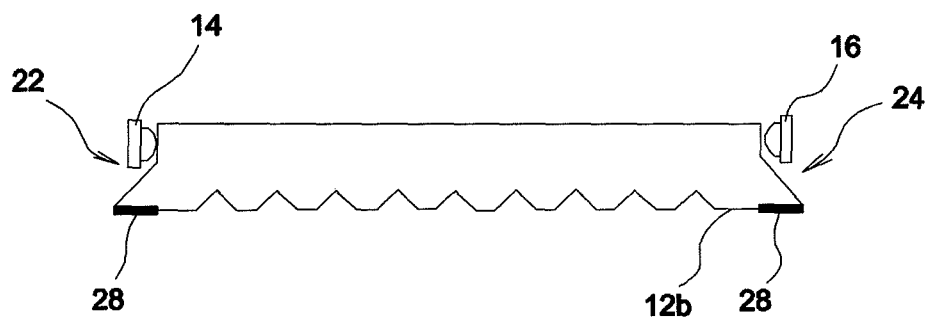

The notch structures in the embodiments do not require a particular configuration. For example, each of the first notch structure 22 and the second notch structure 24 may have only one inclined surface connected with the light-emitting surface 12a (FIG. 3A) or the bottom surface 12b (FIG. 3B). Though not depicted, in another embodiment, the first notch structure 22 may have a single inclined surface connected with the light-emitting surface 12a, and the second notch structure 24 may have a single inclined surface connected with the bottom surface 12b. Besides, the notch structures 22 and 24 are not limited to a trapezoidal-shaped cross-section, as long as at least one reflective inclined surface is provided.

Figure 4:
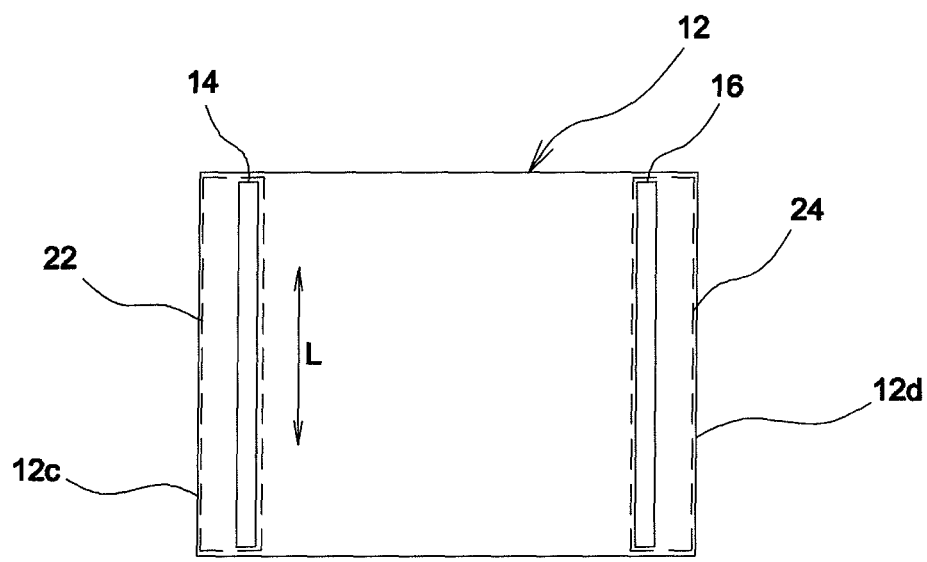
FIG. 4 shows a top view of a backlight module according to an embodiment of the invention.
Figure 5:
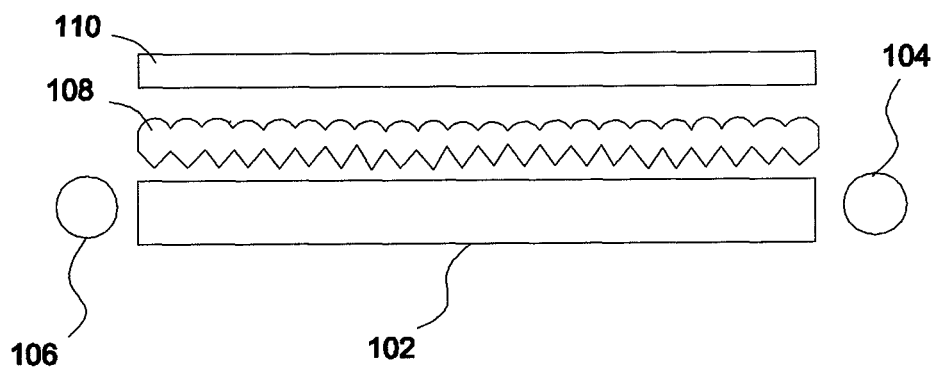
FIG. 5 shows a schematic diagram illustrating a conventional display device having two different viewing angles.
Figure 6:
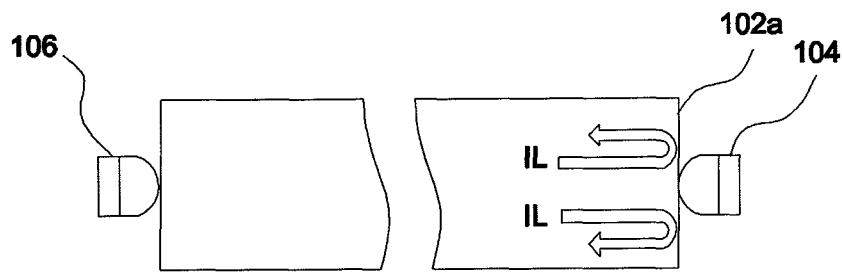
FIG. 6 shows a schematic diagram of a light path for illustrating the phenomenon of optical crosstalk in a conventional display device.

Referring to FIG. 4, in one embodiment, a length of the first notch structure 22 extending in a longitudinal direction L is substantially equal to a length of the first side surface 12c, and a length of the second notch structure 24 extending in a longitudinal direction L is substantially equal to a length of the second side surface 12d. In other words, in this embodiment, each of the notch structures 22 and 24 is continuously formed on a side surface of the light guide plate 12. For example, each of the notch structures 22 and 24 may be a stripe-shaped structure formed on the corresponding side surface of the light guide plate 12. Therefore, when each of the light sources 14 and 16 is disposed on the corresponding light incident surface of the light guide plate 12, the light sources 14 and 16 do not need to be arranged in a specific position but are simply put into the notch structures 22 and 24. Therefore, fabrication or assembly processes is simplified. Further, in one embodiment, only one side of the backlight module 10 is provided with a light source and correspondingly forms a single notch structure to store the light source, and a light absorption layer is formed on an area overlapping or corresponding to a projection area P of the inclined surface(s) of the notch structure projected on the light-emitting surface and/or the bottom surface. Typically, a part of a front end of an edge-lighting type light guide plate adjacent to the light incident surface functions as a light-mixing area to blend different incoming light beams. Therefore, in case only one side of the backlight module 10 is provided with a light source and a notch structure, a light absorption layer formed on the light-emitting surface may serve to absorb or shield stray light traveling in the light-mixing area to improve image quality.

In conclusion, the backlight module of the embodiment or the embodiments of the invention may have at least one of the following advantages.

When a part of the light beams emitted from one end of the light guide plate is incident to an opposite end of the light guide plate, the part of the light beams is deflected by a notch structure formed on the opposite end and absorbed by the light absorption layer. Therefore, the light beam traveling in an incorrect or unexpected direction is not received by a viewer and the optical crosstalk is reduced. Further, since an inclined surface is continuously formed to achieve the effect of light deflection, specific micro structures disposed in the front of a light source may not be required and the light source need not be arranged in a specific position corresponding to the position of the specific micro structures. Therefore, simplified fabrication processes and high luminous efficiency are achieved. The light absorption layer may also serve to absorb or shield stray light traveling in a light-mixing area of a light guide plate so as to improve image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising:
a light guide plate having a light-emitting surface and at least one side surface forming an angle with the light-emitting surface;
a notch structure continuously formed on the side surface and concave towards the inside of the light guide plate;
a light absorption layer distributed on an area substantially overlapping the notch structure; and
at least one light source stored in the notch structure.

2. The backlight module as claimed in claim 1, wherein the notch structure has at least one inclined surface forming an angle with the light-emitting surface, the area of the light absorption layer distributed substantially overlaps a projection area of the at least one inclined surface projected on the light-emitting surface.

3. The backlight module as claimed in claim 1, wherein the light guide plate further comprises a bottom surface opposite the light-emitting surface, the notch structure has at least one inclined surface forming an angle with the bottom surface, and the area of the light absorption layer substantially overlaps a projection area of the at least one inclined surface projected on the bottom surface.

4. The backlight module as claimed in claim 1, wherein a length of the notch structure extending in a longitudinal direction is substantially equal to a length of the side surface.

5. The backlight module as claimed in claim 1, wherein the notch structure has a trapezoidal-shaped cross-section.

6. The backlight module as claimed in claim 2, wherein the angle is larger than or equal to 30 degrees and smaller than or equal to 60 degrees.

7. The backlight module as claimed in claim 1, further comprising:
a parallax film disposed on the light-emitting surface of the light guide plate, and the parallax film having a reverse prism structure to deflect a light beam emitting from the light emitting surface.

8. A backlight module, comprising:
a light guide plate having a light-emitting surface, a bottom surface opposite the light-emitting surface, a first side surface, and a second side surface opposite the first side surface, wherein each of the first side surface and the second side surface forms an angle with the light-emitting surface;
a first notch structure continuously formed on the first side surface and concave towards the inside of the light guide plate, wherein the first notch structure has at least one first inclined surface forming an angle with the light-emitting surface;
a second notch structure continuously formed on the second side surface and concave towards the inside of the light guide plate, wherein the second notch structure has at least one second inclined surface forming an angle with the light-emitting surface;
a first light absorption layer disposed on a part of the light-emitting surface to absorb a light beam deflected by the first inclined surface or the second inclined surface;
a second light absorption layer disposed on a part of the bottom surface to absorb a light beam deflected by the first inclined surface or the second inclined surface;
a first light source stored in the first notch structure; and
a second light source stored in the second notch structure.

9. The backlight module as claimed in claim 8, wherein a distribution area of the first light absorption layer substantially overlaps a projection area of the first inclined surface and the second inclined surface projected on the light-emitting surface, and a distribution area of the second light absorption layer substantially overlaps a projection area of the first inclined surface and the second inclined surface projected on the bottom surface.

10. The backlight module as claimed in claim 8, wherein a length of the first notch structure extending in a longitudinal direction is substantially equal to a length of the first side surface, and a length of the second notch structure extending in a longitudinal direction is substantially equal to a length of the second side surface.

11. The backlight module as claimed in claim 8, wherein each of the first notch structure and the second notch structure has a trapezoidal-shaped cross-section.

12. The backlight module as claimed in claim 8, wherein an angle formed between the first inclined surface and the light-emitting surface is larger than or equal to 30 degrees and smaller than or equal to 60 degrees, and an angle formed between the second inclined surface and the light-emitting surface is larger than or equal to 30 degrees and smaller than or equal to 60 degrees.

13. The backlight module as claimed in claim 8, further comprising:
a parallax film disposed on the light-emitting surface of the light guide plate, and the parallax film having a reverse prism structure to deflect a light beam emitting from the light emitting surface.

* * * * *